(12) United States Patent
Whitt

(10) Patent No.: US 7,735,793 B2
(45) Date of Patent: Jun. 15, 2010

(54) QUICK-RELEASE MOUNTING BRACKET FOR A HAND TRUCK

(76) Inventor: Robert Whitt, 86 Shipway Rd., Dundalk, MD (US) 21222-4418

( * ) Notice: Subject to any disclaimer, the term of this patent is extended or adjusted under 35 U.S.C. 154(b) by 283 days.

(21) Appl. No.: 11/900,354

(22) Filed: Sep. 11, 2007

(65) Prior Publication Data

US 2008/0116344 A1 May 22, 2008

Related U.S. Application Data

(60) Provisional application No. 60/843,524, filed on Sep. 11, 2006.

(51) Int. Cl.
*A47G 1/10* (2006.01)
(52) U.S. Cl. .................. 248/316.1; 248/316.4; 248/500; 410/7; 410/51
(58) Field of Classification Search .................. 248/500, 248/503, 506, 680, 681, 316.1, 316.3, 316.4, 248/229.22; 410/3, 7, 46, 51, 66, 77, 80
See application file for complete search history.

(56) References Cited

U.S. PATENT DOCUMENTS

| 4,915,342 | A | * | 4/1990 | Nilsson | 248/500 |
| 5,890,693 | A | * | 4/1999 | Do et al. | 248/346.03 |
| 6,896,232 | B2 | * | 5/2005 | Crowell et al. | 248/316.4 |
| 2008/0011930 | A1 | * | 1/2008 | Nagai et al. | 248/503 |
| 2008/0203259 | A1 | * | 8/2008 | Harrison et al. | 248/316.1 |

* cited by examiner

*Primary Examiner*—Ramon O Ramirez
(74) *Attorney, Agent, or Firm*—Ober / Kaler; Royal W. Craig

(57) ABSTRACT

A locking bracket for securing virtually any commercial grade hand truck to the cargo bed of a delivery truck or any other surface for safety and security. The locking bracket generally comprises a flat mounting plate, a kick-lever pivotally attached to the mounting plate for kick-release, and a push rod attached to the other end of the lever. The push rod extends to a clamping mechanism including two upwardly protruding spaced blocks housing opposed laterally-closing clamping teeth. In operation, a hand truck is locked in place overtop in a standing position with the center strut of its nose plate clamped between the teeth. Urging the lever forward with one's foot drives the push rod which opens the clamping teeth for quick-kick release of the hand truck.

1 Claim, 3 Drawing Sheets

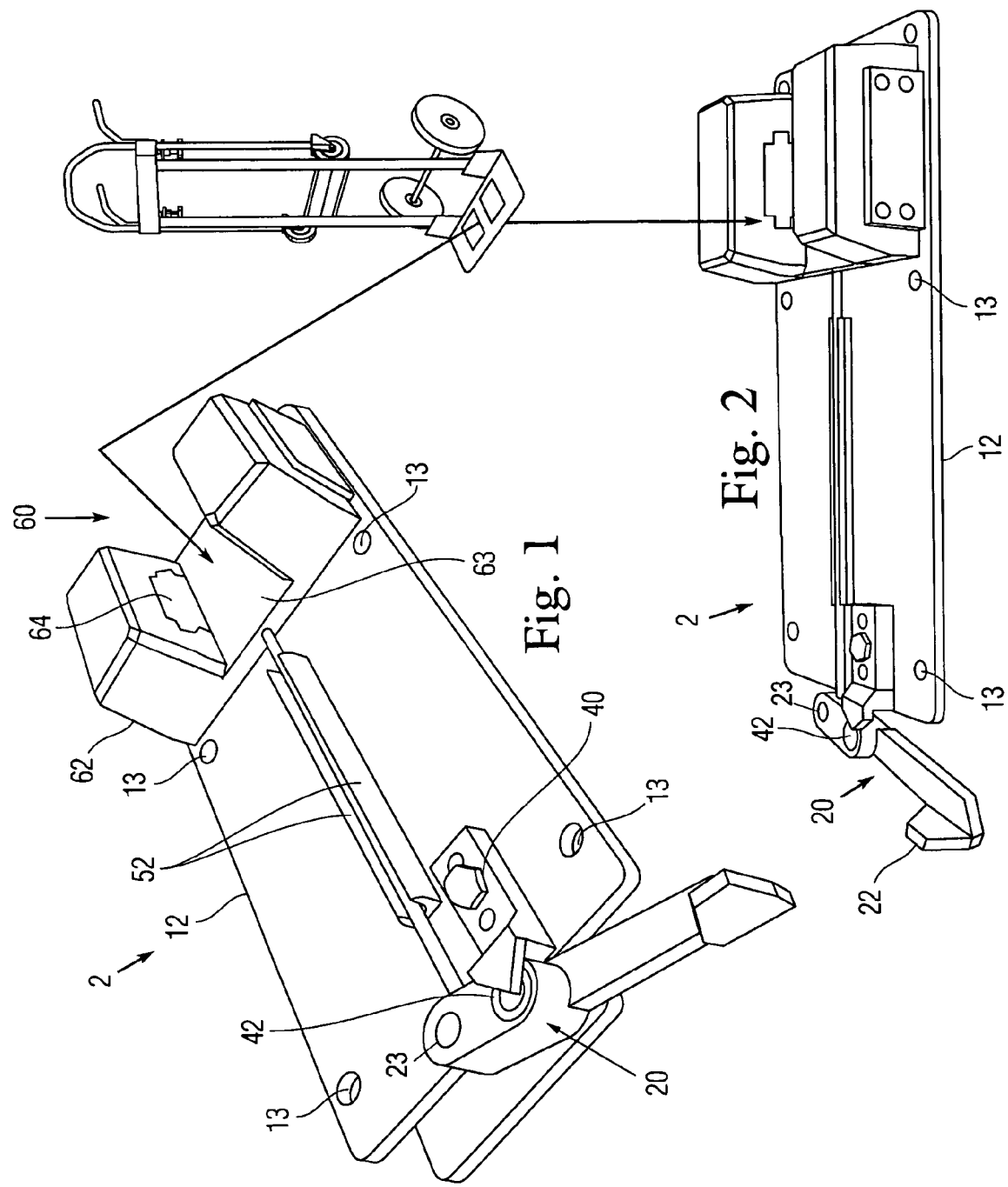

QUICK-RELEASE MOUNTING BRACKET FOR A HAND TRUCK

CROSS-REFERENCE TO RELATED APPLICATIONS

The present application derives priority from U.S. provisional application No. 60/843,524 filed 11 Sep. 2006.

BACKGROUND OF THE INVENTION

1. Field of the Invention

The present invention relates to mounting brackets and, more particularly, to a mounting bracket for constraining a hand truck inside the cargo bay of a delivery truck and for allowing a quick kick-release of the hand truck when needed.

2. Description of the Background

Professional movers and logistics companies invariably use hand trucks to move boxes, appliances, furniture, vending items and more. Hand trucks are so essential to smooth distribution that significant research and development goes into making better hand trucks.

For example, UPS™ has a long history of supporting design improvements to further the comfort and safety of all its employees. The company has invested more than $180 million during the past five years on safety-related initiatives. These include small changes such as reducing the rear door step height of delivery trucks from ten inches to six inches to enable drivers and loaders easier access with less effort. They also include significant design efforts for the hand trucks used by their drivers. UPS purchases an average of 13,000 new hand trucks every year. Their vendors tend to listen, so UPS requires hand trucks to be constructed of aluminum instead of steel to minimize weight. They also specify an additional handle for more control and maneuverability, and larger wheels to make for easier maneuvering.

Unfortunately, there is one problem as yet unaddressed by UPS, as well as other logistics carriers, movers and freight companies. When the moving is complete the hand truck is thrown into the cargo bay of the truck and the truck heads home. During transit hand trucks tend to bang and bounce around in the truck. Indeed, a few have caused significant injury to drivers.

It would, therefore, be greatly advantageous to provide a locking bracket for securing hand trucks to any surface, and especially to the floor of the cargo bay of a delivery truck. This presents a number of challenges. For one, commercial hand trucks are unwieldy and any containment bracket must of necessity be very sturdy. Also, any locking bracket must be equipped with a quick-release for easy detachment of the hand truck. In addition, there are scarce few ways of securing a hand truck to begin with. Commercial hand trucks comprise a tubular aluminum frame with two pneumatic wheels. The total hand truck height typically ranges from 40-60", and frame width from 10-16". The frame extends down to a cast aluminum "nose plate" typically 10-16" wide and 4-8" deep. The axle bearing the wheels is raised a few inches off the ground, and when laid on its back the frame remains raised off the ground. Consequently, there is not much opportunity for a locking bracket to latch onto anything. Fortunately, the vast majority of professional grade hand trucks employ nose plates in the form of a "figure 8", such that the flat rectangular nose plate is defined by two opposing rectangular apertures separated by a central strut. The present inventor views this central strut as an excellent anchor point for a locking bracket.

SUMMARY OF THE INVENTION

Accordingly, it us an object of the present invention to provide a secure locking bracket for securing a commercial grade hand truck to the cargo bed of a delivery truck or any other surface for safety and security.

It is another object to provide a locking bracket as described above that locks a commercial grade hand truck in a standing position via the center strut of its nose plate.

It is another object to provide a locking bracket as described above with a quick-release mechanism and kick plate for easy foot-operated release of the hand truck.

It is still another object to provide a locking bracket as described above that is durable enough in design and construction to withstand the rigors of a delivery truck environment.

These and other objects are accomplished herein by a secure locking bracket for securing virtually any commercial grade hand truck to the cargo bed of a delivery truck or any other surface for safety and security. The locking bracket generally comprises a flat mounting plate adapted for attachment to surface (such as a cargo bed) by screws or the like, a lever with distal kick plate on one end pivotally attached to the mounting plate for kick-release, and a push rod attached to the other end of the lever. The push rod extends to a clamping mechanism including two upwardly protruding spaced blocks housing opposed laterally-closing clamping teeth. In operation, a hand truck is situated overtop with the center strut of its nose plate seated there between. Urging the lever forward with one's foot drives the push rod which engages a slide plate. The slide plate actuates the clamping mechanism to open the clamping teeth, thereby allowing the center strut of the clamping mechanism nose plate to fall into place beneath the clamping teeth. When the lever is released the clamping teeth, which are spring biased toward a normally closed position, close and lock the hand truck in place in a standing position. The clamping mechanism is rugged enough to withstand the extreme conditions of a moving cargo bed. To release the hand truck a driver need only kick the kick plate to open the teeth and allow withdrawal.

Other variations and advantages are described in the detailed description below.

BRIEF DESCRIPTION OF THE DRAWINGS

Other objects, features, and advantages of the present invention will become more apparent from the following detailed description of the preferred embodiment and certain modifications thereof when taken together with the accompanying drawings in which:

FIG. 1 is a top perspective view of the hand truck locking bracket 2 according to the present invention.

FIG. 2 is a side perspective view of the hand truck locking bracket 2 as in FIG. 1.

DETAILED DESCRIPTION OF THE PREFERRED EMBODIMENTS

Figure 3:
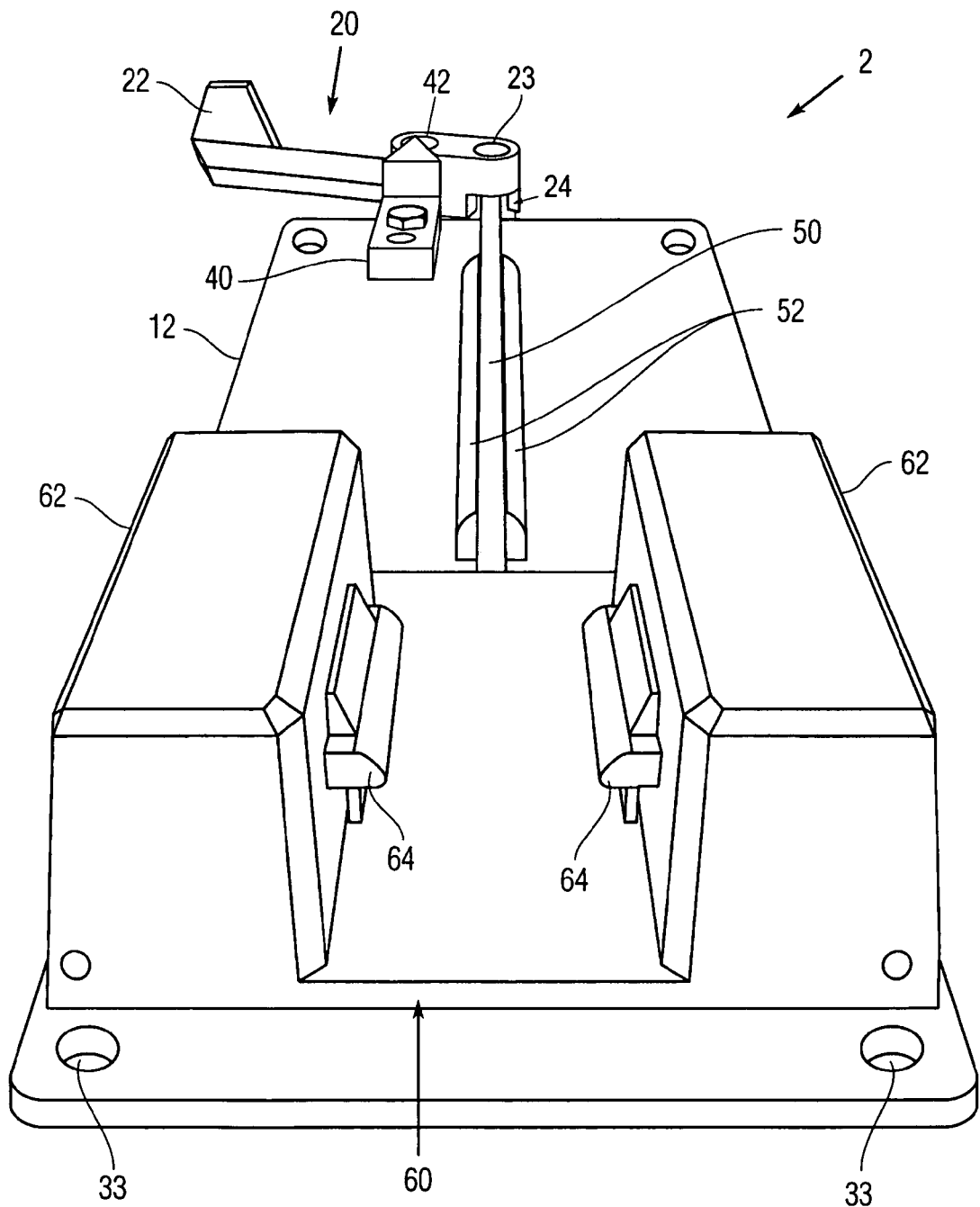
FIG. 3 is a top assembly diagram of the hand truck locking bracket 2 as in FIGS. 1-2.

The present invention is a secure locking bracket for anchoring a commercial grade hand truck to the cargo bed of a delivery truck (or any other surface) for safety and security, so that the truck is not free to bang around during driving. The locking bracket securely locks a commercial grade hand truck in a standing position via the center strut of its nose plate, and yet provides a quick-release mechanism for easy foot-operated release of the hand truck when needed. The locking bracket is highly durable in design and construction to withstand the rigors of a moving delivery truck cargo hold.

FIG. 1 is a top perspective view, and FIG. 2 is a side perspective view of the hand truck locking bracket 2 according to the present invention. The locking bracket 2 is adapted for securing virtually any commercial grade hand truck (see inset) with a standard nose plate (NP) to the cargo bed of a delivery truck or any other surface for safety and security. Toward this end, the locking bracket generally comprises a flat mounting plate 12 adapted for attachment to a surface (such as a cargo bed) by screws or the like. The screws (not shown) may be inserted through screw holes 13 in the mounting plate 12. The mounting plate 12 serves as a support surface for a lever 20 with distal kick plate 22 on one end. A bracket 40 is attached at the top end of the mounting plate 12 and extends a hub 42 upon which the lever 20 is pivotally mounted. The other end of lever 20 is engaged to a push rod 50 which extends lengthwise down the mounting plate 12 and is slidably seated in a track 52. The track 52 serves primarily to protect the push rod 50 from damage and extends slightly above the push rod 50 on both sides for that purpose. The push rod 50 extends to a clamping mechanism 60 that generally includes two upwardly protruding spaced hollow blocks 62 separated by a deck 63, the blocks 62 housing laterally-closing clamping teeth 64. The push rod 50 urges a slide plate (obscured but described below) seated below the deck 63 which engages the clamping teeth 64 and moves them in (toward each other) or out (away). The teeth 64 are spring biased toward a normally-closed position and so kicking or otherwise moving the lever 20 opens them. Thus, in general operation a hand truck is situated overtop with the center strut NP of its nose plate seated between the blocks 62. Urging the lever 20 forward with one's foot drives the push rod 50 which engages the underlying slide plate, which in turn actuates the clamping mechanism 60 to open the clamping teeth 64, thereby allowing the center strut NP of the nose plate to fall into place against the deck 63 beneath the clamping teeth 64. When the lever 20 is then released the clamping teeth 64, which are spring-biased toward a normally closed position, close and lock the hand truck in place in a standing position. The clamping mechanism 60 is rugged enough to withstand the extreme conditions of a moving cargo bed. To release the hand truck a driver need only kick the kick plate 22 to open the teeth 64 and allow quick withdrawal.

The flat mounting plate 12 may be any rigid planar and durable plate defined by screw holes 13 for screw-attachment to a surface such as a cargo bed. The mounting plate 12 serves as a support surface for all other components including the elongate lever 20. The bracket 40 is a body bolted to the mounting plate 12 and terminating at a pivot joint comprising an annular hub 42 as shown. In the preferred embodiment the annular hub 42 is formed by a sealed bearing to ensure smooth operation. The lever 20 is defined by a circular aperture at its midsection that conforms to the hub 42. Thus, the lever 20 is pivotally seated on the mounting plate 12 with hub 42 protruding into the aperture of lever 20. One side of lever 20 carries the distal kick plate 22, which kick plate 22 extended off to the side of mounting plate 12 for unfettered access.

FIG. 3 is an exploded end view of the hand truck locking bracket 2 as in FIGS. 1-2 which best shows how the push rod 50 is engaged to the lever 20. Preferably, another sealed bushing 23 is held captive in at the end of lever 20 and the push rod 50 is coupled directly to the pivoting portion of this bushing 23. This couples the push rod 50 to the lever 20 and yet leaves it free to pivot angularly with respect to the lever 20. Note that the lever 20 should be defined by a window 24 in the area of the junction with push rod 50 to provide clearance for pivoting. The push rod 50 is a small cylindrical rod of stainless steel or the like that extends lengthwise along the mounting plate 12. To prevent bending of the push rod 50 that could inhibit or prevent movement, track 52 is placed beneath the push rod between the push rod and the mounting plate. The track 52 slidably seats the push rod 50 in a semi-circular channel and extends flanking side-walls up on either side of the push rod 50, the side walls protruding slightly overtop the push rod 50 to prevent objects, for example wheels rolling over the mounting plate, from contacting the push rod. The track 52 may be formed from a single piece of elongate machined aluminum, plastics, polymers, other rugged materials and combinations thereof.

The push rod 50 extends toward and into clamping mechanism 60 shown here at the near end of the mounting plate 12. The clamping mechanism includes two upwardly protruding hollow blocks 62 that serve the dual purposes of guiding the hand truck into position and enclosing the operative components of the locking mechanism. The blocks 62 may be integrally formed and machined as a single components in which case they are joined by connecting rails. A deck 63 lies atop the connecting rails. In one embodiment, the deck is a hardened plate of stainless steel or the like for seating a correspondingly dimensioned portion of the nose plate of the hand truck. The blocks 62 are defined by rectangular windows in their opposing surfaces to pass the teeth of the laterally-closing clamping teeth 64. As stated above, the push rod 50 engages the clamping teeth 64 and moves the clamping teeth inward (toward each other) or outward (away from each other) from a normally-closed position to an open position. A hand truck may be locked in place in the locking bracket simply by standing it upright overhead with the center strut of its nose plate seated crosswise between the blocks 62. The clamping teeth 64 will be closed, but urging the lever 20 forward with one's foot actuates the clamping mechanism 60, opens the clamping teeth 64, and allows the center strut NP of the nose plate to fall into place against the deck 63 beneath the clamping teeth 64. When the lever 20 is then released the clamping teeth 64 are spring-biased back to their normally closed position, securely closing and locking the hand truck in place in the standing position. To release the hand truck, a driver need only kick the kick plate 22 to open the teeth 64 and allow quick withdrawal.

At this point one skilled in the art will readily understand that the present design of the clamping mechanism 60 is rugged enough to withstand even the extreme conditions of a moving cargo bed with shifting cargo. All moving components are well-protected, and the components most prone to fouling by dirt are enclosed inside the two blocks 62 as described below in more detail.

Figure 4:
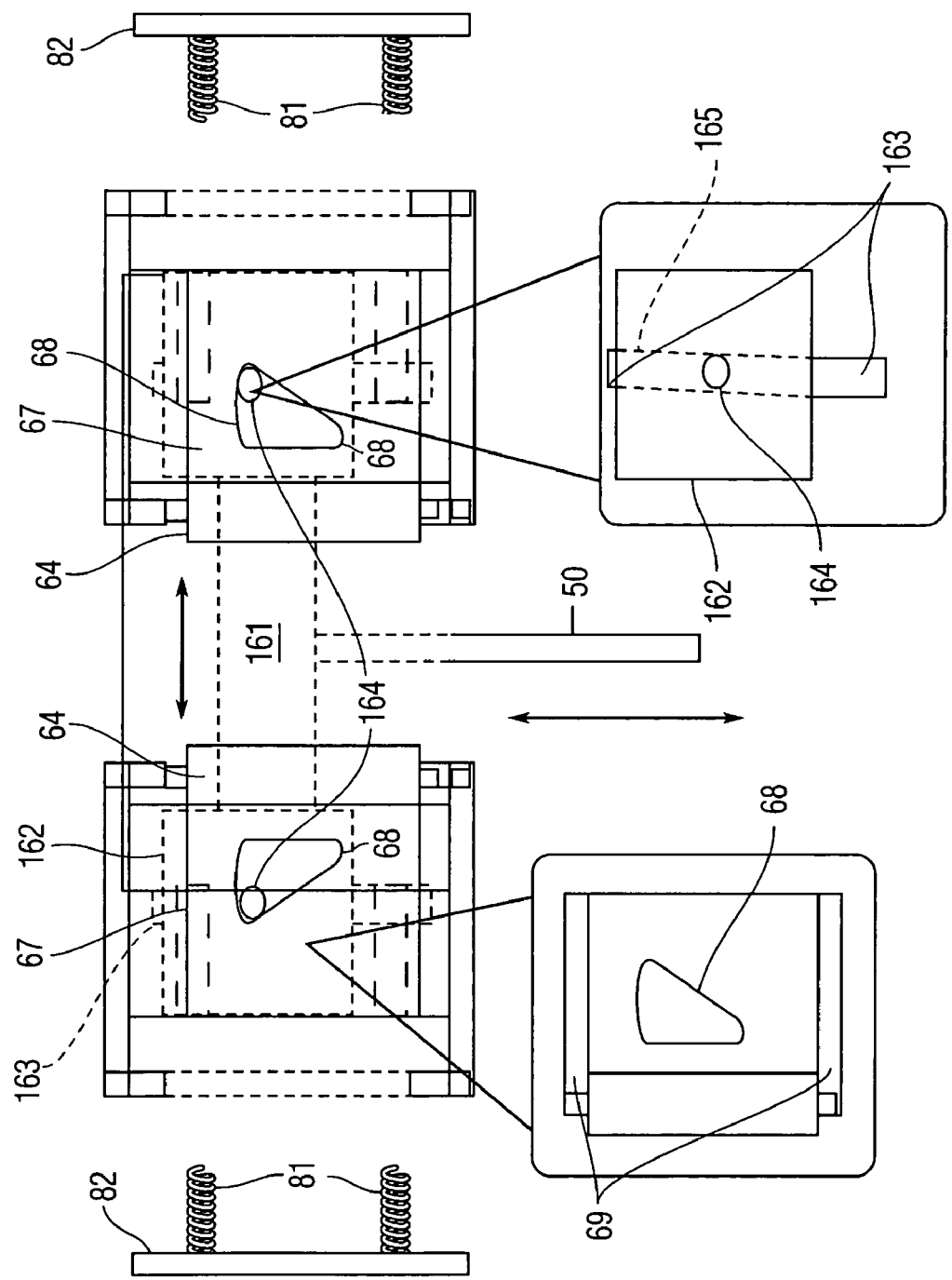
FIG. 4 is an exploded end view of the hand truck locking bracket 2 as in FIGS. 1-3.

Referring to FIG. 4, a top assembly diagram of the hand truck locking bracket 2 is shown. The push rod 50 extends to and is coupled to a slide plate 161 that is slidably mounted beneath the deck 63 of the clamping mechanism 60. The slide plate 161 engages a pair of guide members 162, one each of the guide members 162 being mounted beneath each of the blocks 62. Each guide member 162 comprises a rectangular block defined by a through bore 165 of cylindrical cross-section (see inset at lower right of FIG. 3). The guide members 162 are slidably mounted on rails 163 comprising a short length of stainless dowel anchored lengthwise within the blocks 62. Thus, the guide members 162 are capable of transverse sliding along rails 163 across the hollow interior of the blocks 62. The guide members 162 each have a guide pin 164 mounted there atop. The clamping teeth 64 described previously include a rectangular body 67 housed interiorly of the blocks 62. The bodies 67 of clamping teeth are preferably formed with tongue and groove rails 69 (see inset to left of FIG. 3) that fit within channels formed along the sides of the inside surfaces of blocks 62 to guide back-and-forth sliding of the clamping teeth 64. The clamping teeth 64 move laterally (see arrow) perpendicular to the motion of the push rod 50. This movement is incited by the guide pin 164 of guide members 162 which drives the clamping teeth 64 laterally. More specifically, the guide pins 164 fit into the triangular guide slot 68 formed in the bodies 67 of clamping teeth 64. As the guide pins 164 move downward (vertically in FIG. 3) they engage the canted side of the triangular guide slot 68 and drive the clamping teeth 64 inward to their open position. The opening of guide teeth is opposed by a spring bias imparted by a pair of conventional coil springs 81. The coil springs 81 are mounted on nipples formed on the inner surfaces of closure plates 82. The closure plates 82 are attached to the backs of blocks 62 (by corner screws or the like) and thereby provide access inside the blocks 62. The springs 81 protrude in parallel into two corresponding bores in the bodies 67 of guide teeth 64, and the springs 81 impart a fairly stiff bias that forces the guide teeth 64 toward their normally closed position. Urging the lever 20 forward with one's foot drives the push rod 50 which engages the underlying slide plate, which in turn actuates the clamping mechanism 60 to open the clamping teeth 64, thereby allowing the center strut NP of the nose plate to fall into place against the deck 63 beneath the clamping teeth 64. When the lever 20 is then released the clamping teeth 64, which are spring-biased toward a normally closed position, close and lock the hand truck in place in a standing position. The leveraged action of the clamping mechanism 60 as detailed above overcomes this bias and opens the teeth 64 for quick-release and removal of the hand truck.

It should now be apparent that the above-described locking bracket is capable of securing a commercial grade hand truck to the cargo bed of a delivery truck or any other surface for increased safety and security, the hand truck remaining in a standing position by grip of the center strut of its nose plate. A quick-kick-release allows easy foot-operated release of the hand truck for utmost convenience of the driver. Moreover, the device is durable enough in design and construction to withstand the rigors of a delivery truck environment.

Having now fully set forth the preferred embodiments and certain modifications of the concept underlying the present invention, various other embodiments as well as certain variations and modifications thereto may obviously occur to those skilled in the art upon becoming familiar with the underlying concept. It is to be understood, therefore, that the invention may be practiced otherwise than as specifically set forth herein.

I claim:

1. A secure locking bracket for securing a hand truck to a surface, comprising:
   a mounting plate adapted for attachment to said surface;
   a lever pivotally attached to said mounting plate;
   a push rod attached to one end of said lever; and
   a clamping mechanism comprising:
      a pair of upwardly protruding blocks having a space in between for guiding and seating a center strut of a hand truck; and
      a pair of laterally opposed clamping teeth each mounted in a corresponding block and actuable by said lever and push rod to extend inwardly from said blocks across said space to clamp the center strut of the hand truck therein.

* * * * *